(12) United States Patent
Beckett

(10) Patent No.: US 8,285,147 B2
(45) Date of Patent: Oct. 9, 2012

(54) BULK MODULATION OF MULTIPLE WAVELENGTHS FOR GENERATION OF CATV OPTICAL COMB

(75) Inventor: Douglas James Beckett, Kanata (CA)

(73) Assignee: LG-Ericsson Co., Ltd., Seoul (KR)

( * ) Notice: Subject to any disclaimer, the term of this patent is extended or adjusted under 35 U.S.C. 154(b) by 574 days.

(21) Appl. No.: 12/512,407

(22) Filed: Jul. 30, 2009

(65) Prior Publication Data

US 2010/0028005 A1    Feb. 4, 2010

Related U.S. Application Data

(60) Provisional application No. 61/085,217, filed on Jul. 31, 2008.

(51) Int. Cl.
 *H04B 10/00*    (2006.01)
(52) U.S. Cl. .......................... 398/182; 398/72
(58) Field of Classification Search .............. 398/66–73, 398/182, 183
 See application file for complete search history.

(56) References Cited

U.S. PATENT DOCUMENTS

| | | | | | |
|---|---|---|---|---|---|
| 5,010,346 | A | * | 4/1991 | Hamilton et al. | 341/137 |
| 5,020,049 | A | * | 5/1991 | Bodeep et al. | 398/76 |
| 5,166,821 | A | * | 11/1992 | Huber | 359/238 |
| 5,200,964 | A | * | 4/1993 | Huber | 372/26 |
| 5,351,147 | A | * | 9/1994 | Frenkel | 398/79 |
| 5,373,389 | A | * | 12/1994 | Huber | 398/194 |
| 5,394,489 | A | * | 2/1995 | Koch | 385/14 |
| 5,420,868 | A | * | 5/1995 | Chraplyvy et al. | 398/185 |
| 5,541,757 | A | * | 7/1996 | Fuse et al. | 398/72 |
| 5,546,210 | A | * | 8/1996 | Chraplyvy et al. | 398/79 |
| 5,546,415 | A | * | 8/1996 | Delfyett et al. | 372/25 |
| 5,600,473 | A | * | 2/1997 | Huber | 398/87 |
| 5,663,822 | A | * | 9/1997 | Fee | 398/95 |
| 5,689,356 | A | * | 11/1997 | Rainal | 398/76 |
| 5,691,832 | A | * | 11/1997 | Liedenbaum et al. | 398/43 |
| 5,701,186 | A | * | 12/1997 | Huber | 398/72 |
| 5,710,651 | A | * | 1/1998 | Logan, Jr. | 398/168 |
| 5,896,211 | A | * | 4/1999 | Watanabe | 398/76 |
| 5,953,139 | A | * | 9/1999 | Nemecek et al. | 398/79 |
| 5,963,567 | A | * | 10/1999 | Veselka et al. | 372/21 |
| 6,236,666 | B1 | * | 5/2001 | Mirov et al. | 372/23 |
| 6,282,005 | B1 | * | 8/2001 | Thompson et al. | 398/143 |
| 6,556,327 | B1 | * | 4/2003 | Ohya et al. | 398/198 |
| 6,606,178 | B1 | * | 8/2003 | Rhee et al. | 398/188 |
| 6,661,974 | B1 | * | 12/2003 | Akiyama et al. | 398/95 |
| 6,724,523 | B2 | * | 4/2004 | Yap | 359/333 |
| 6,775,483 | B1 | * | 8/2004 | Ikushima et al. | 398/186 |
| 6,970,654 | B1 | * | 11/2005 | Paglione et al. | 398/182 |
| 7,085,499 | B2 | * | 8/2006 | Yap et al. | 398/183 |
| 7,164,858 | B2 | * | 1/2007 | Shiozaki et al. | 398/49 |
| 7,228,077 | B2 | * | 6/2007 | Newell et al. | 398/159 |
| 7,286,761 | B2 | * | 10/2007 | Birk et al. | 398/66 |
| 7,382,986 | B2 | * | 6/2008 | Ohya et al. | 398/186 |
| 7,489,836 | B2 | * | 2/2009 | Barnett et al. | 385/14 |
| 7,499,653 | B2 | * | 3/2009 | Yap | 398/115 |

(Continued)

*Primary Examiner* — Agustin Bello
(74) *Attorney, Agent, or Firm* — Ked & Associates LLP

(57) ABSTRACT

A system for generating an optical CATV comb comprising a plurality of wavelength division multiplexed (WDM) optical CATV signals. A set of one or more lasers generate a plurality of narrow-band continuous wave (CW) lights, each CW light having a respective predetermined wavelength and optical power level. An optical MUX couples the plurality of CW lights into a WDM continuous wave light. A broadband optical modulator responsive to a CATV signal modulates the WDM continuous wave light to generate the optical CATV comb.

6 Claims, 2 Drawing Sheets

U.S. PATENT DOCUMENTS

| | | | |
|---|---|---|---|
| 7,577,367 B2 * | 8/2009 | Way | 398/183 |
| 7,634,200 B2 * | 12/2009 | Chan et al. | 398/185 |
| 7,664,403 B2 * | 2/2010 | Newell et al. | 398/154 |
| 7,761,011 B2 * | 7/2010 | Gopinath | 398/155 |
| 7,965,947 B2 * | 6/2011 | Yu et al. | 398/185 |
| 2005/0013612 A1 * | 1/2005 | Yap | 398/53 |
| 2010/0028005 A1 * | 2/2010 | Beckett | 398/79 |

* cited by examiner

BULK MODULATION OF MULTIPLE WAVELENGTHS FOR GENERATION OF CATV OPTICAL COMB

CROSS-REFERENCE TO RELATED APPLICATIONS

This application is based on, and claims priority from, U.S. Provisional Patent Application Ser. No. 61/085,217, filed Jul. 31, 2008, the entire contents of which are incorporated herein by reference.

FIELD OF THE INVENTION

The present application relates generally to optical broadcast of CATV signals, and, more specifically, to bulk modulation of multiple wavelengths for generation of a CATV optical comb.

BACKGROUND OF THE INVENTION

Cable TV (CATV) signals are traditionally broadcast to subscribers through co-axial cables. In recent years, it has become increasingly desirable to use passive optical networks (PONs) in place of the traditional copper co-axial cable infrastructure. In such cases, the conventional electrical CATV signal is typically modulated onto a narrow-band optical carrier using a transmitter of the type illustrated in FIG. 1a. As may be seen in FIG. 1a, the transmitter 2 comprises a laser 4 optically coupled to an external modulator 6. The laser 4 (which may, for example, be provided as a conventional Transmission Optical Sub-Assembly (TOSA)) outputs a narrow-band continuous wave (CW) light 8 having a desired wavelength and optical power. The external modulator 6 (which may, for example, be provided as a variable optical attenuator or a Mach-Zehnder interferometer) receives the electrical CATV signal 10, and imposes a corresponding amplitude (or phase) modulation on the CW light 8 output by the laser 4. The resulting modulated optical CATV signal 12 can then be transmitted to subscribers through an optical fibre network (not shown) such as a passive optical network (PON).

In some cases, it is desirable to generate modulated optical CATV signals 12 on multiple wavelengths. This is typically accomplished by duplicating the arrangement of FIG. 1a for each wavelength. Thus, in the transmitter 14 of FIG. 1b, multiple single-wavelength transmitters 2 are used, in parallel, to generate respective optical CATV signals 12 on the desired wavelengths. If desired, an optical MUX 16 may be used to multiplex the optical CATV signals 12 into a WDM CATV signal 18, which may also be referred to as an optical CATV comb. This arrangement can be useful for coupling the optical CATV signals 12 into a PON, particularly in cases where the CATV transmitter is provisioned separately from the Optical Line Terminal (OLT) equipment of the PON. A limitation of this approach is that the use of multiple parallel transmitters 2, each having its own external modulator 6, is expensive.

A less costly arrangement can be constructed by directly driving each laser 4 with the electrical CATV signal 10. With this arrangement, each laser 4 outputs its respective optical CATV signal 12 directly rather than a CW light 8, so that an external modulator 6 within each transmitter 2 is not needed. However, because the frequency and amplitude responses of a laser diode are coupled, driving a laser 4 with the CATV signal 10 produces CATV signal 12 having excursion of both amplitude and frequency (wavelength). As a result, optical CATV signals 12 generated by direct modulation of the lasers 4 tend to suffer from greater distortion than those generated by an external modulator 6.

Techniques that overcome the above-noted deficiencies of the prior art remain highly desirable.

SUMMARY OF THE INVENTION

An aspect of the present invention provides, a system for generating an optical CATV comb comprising a plurality of wavelength division multiplexed (WDM) optical CATV signals. A set of one or more lasers generate a plurality of narrow-band continuous wave (CW) lights, each CW light having a respective predetermined wavelength and optical power level. An optical MUX couples the plurality of CW lights into a WDM continuous wave light. A broadband optical modulator responsive to a CATV signal modulates the WDM continuous wave light to generate the optical CATV comb.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF PREFERRED EMBODIMENTS

The present invention provides techniques for generating an optical CATV comb having a plurality of wavelength division multiplexed (WDM) optical CATV signals. A representative embodiment is described below with reference to FIG. 2.

Figure 1A:
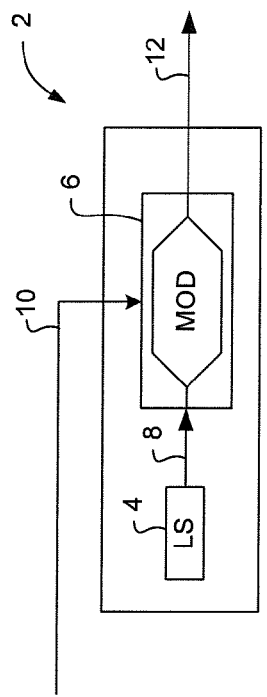
FIGS. 1a and 1b schematically illustrate respective conventional transmitters for generating optical CATV signals.
Figure 1B:
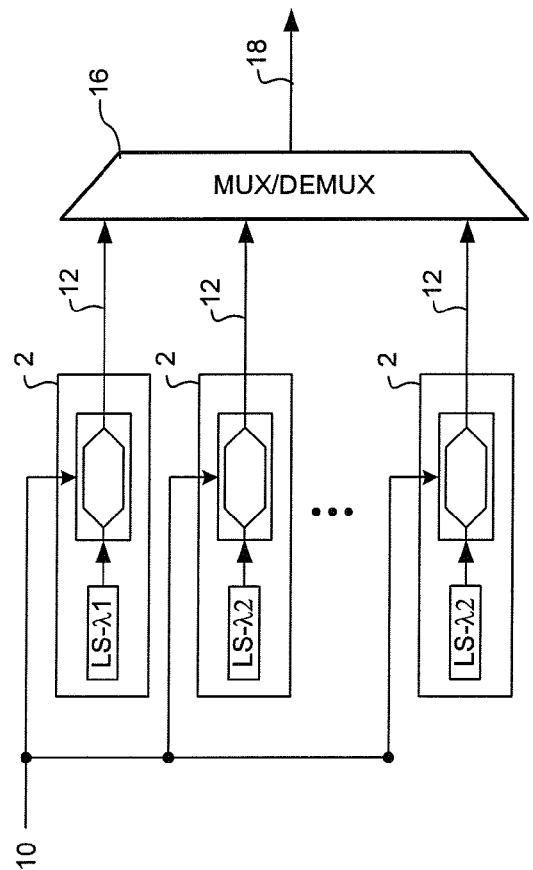
Figure 2:
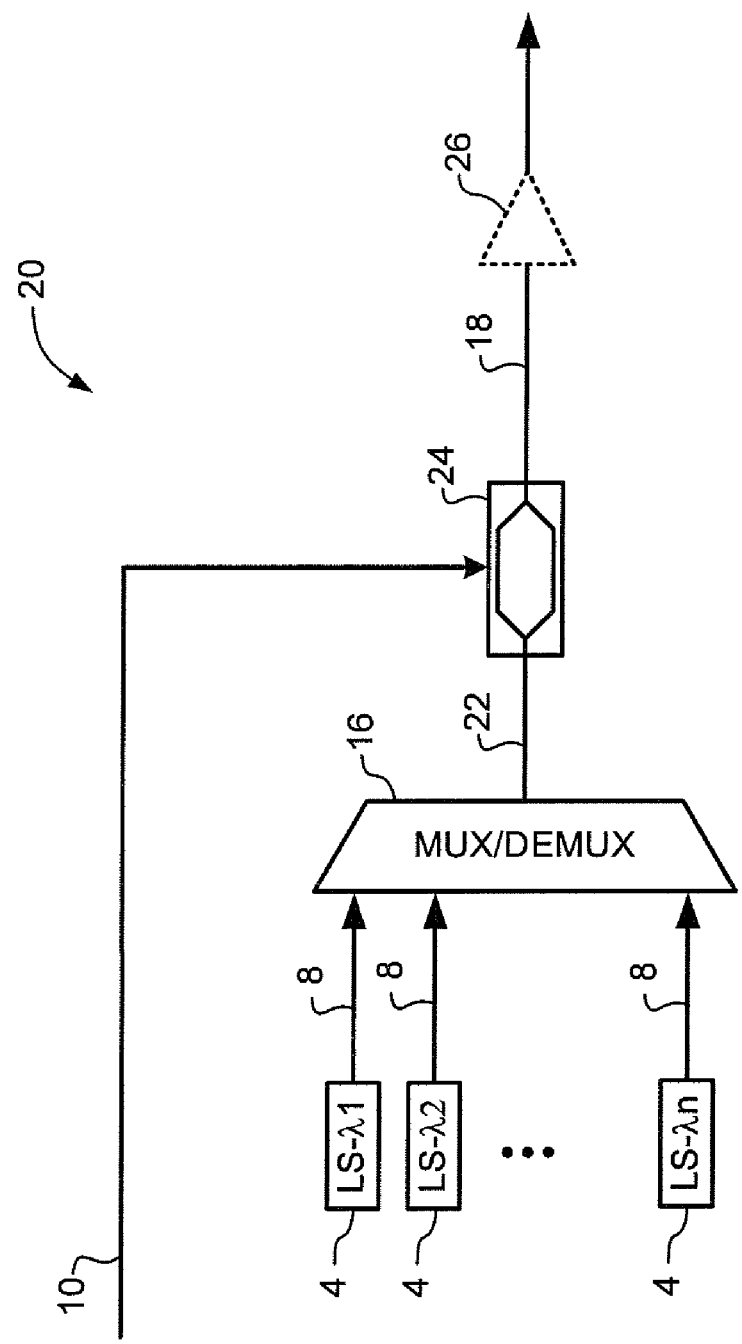
FIG. 2 schematically illustrates a transmitter for generating a CATV optical comb in accordance with a representative embodiment of the present invention.

Referring to FIG. 2, a representative transmitter 20 generally comprises a set of one or more lasers 4 for generating a plurality of narrow-band continuous wave (CW) lights 6. Each CW light 6 preferably has a respective predetermined wavelength and optical power level. An optical MUX 16 couples the plurality of CW lights 6 into a WDM continuous wave light 22, and a broadband optical modulator 24 responsive to a CATV signal 10 modulates the WDM continuous wave light 22 to generate the optical CATV comb 18.

In some embodiments, the number and spectral distribution of the CW lights 6 (and thus the WDM optical CATV signals within the optical CATV comb 18) are selected based on a channel plan of an optical network through which the optical CATV comb 18 is to be transmitted.

If desired, each of the lasers 4 may be provided as a conventional bulk semiconductor laser diode which may, for example, be provided on a Transmission Optical Sub-Assembly (TOSA) device well known in the art. In some embodiments, the number of lasers 4 (or TOSAs) will match the desired number of optical CATV signals multiplexed within the optical CATV comb 18. Alternatively, multi-channel quantum dot lasers can be used, in which case the number of lasers 4 needed to produce all of the optical CATV signals is reduced. Multi-channel quantum dot based lasers are known in the art. In some embodiments, a single multi-channel quantum dot laser may be used to generate all of the desired CW lights 6, in which case the optical MUX 16 is not required to produce the WDM continuous wave light 22.

Any suitable broadband optical modulator 24 may be used to modulate the electrical CATV signal 10 onto the WDM CW light 22. For example, variable optical attenuators and Mach-Zehnder modulators known in the art may be used for this purpose.

As is known in the art, CW lights 6 emitted by semiconductor and quantum dot lasers are coherent and polarized. In cases where the optical modulator 24 is polarization dependent, it will be important to maintain the polarization of the WDM CW light 22 using methods known in the art, such as, for example through the use of Polarization Maintaining Fibre (PMF).

If desired, an optical amplifier 26 (for example an Erbium Doped Fiber Amplifier (EDFA)) can be used to amplify the optical CATV comb 18 at the output of the modulator 24. This arrangement is useful for increasing link budget (and thus signal reach) of the optical CATV comb 18, particularly in cases where the optical CATV comb 18 is to be broadcast through a PON having multiple branches.

The embodiments of the invention described above are intended to be illustrative only. The scope of the invention is therefore intended to be limited solely by the scope of the appended claims.

I claim:

1. A system for generating an optical cable television (CATV) comb having a plurality of wavelength division multiplexed (WDM) optical signals, the system comprising:
  a first number of multi-channel quantum dot lasers for generating a plurality of narrow-band continuous wave (CW) lights, each CW light having a respective predetermined wavelength and optical power level; and
  a broadband optical modulator responsive to a second number of (CATV) signals for modulating the plurality of CW lights to generate the optical CATV comb, wherein:
  the wavelength of each CW light corresponds to a different CATV channel,
  the first number of multi-channel quantum dot lasers is more than one,
  the first number of multi-channel quantum dot lasers is less than the second number of CATV signals, and
  at least two of the modulated CW lights corresponding to different channels have different optical power levels.

2. The system as claimed in claim 1, wherein the system further comprises an optical multiplexer (MUX) for coupling the plurality of CW lights into a WDM continuous wave light, the broadband optical modulator modulating the WDM continuous wave light to generate the optical CATV comb.

3. A system for generating an optical cable television (CATV) comb having a plurality of wavelength division multiplexed (WDM) optical signals, the system comprising:
  a single multi-channel quantum dot laser configured to generate a plurality of continuous wave (CW) lights, each of the CW lights corresponding to a different wavelength and each wavelength corresponding to a respective one of a plurality of CATV channels; and
  a modulator coupled to modulate the plurality of CW lights output from the single multi-channel quantum dot laser, wherein:
  the modulator modulates the CW lights with different data signals,
  the single multi-channel quantum dot laser is the only laser that generates the CW lights for the CATV channels within at least a predetermined channel plan, and
  the modulated CW lights are formed into a WDM continuous wave light without use of a multiplexer.

4. The system as claimed in claim 3, wherein the single multi-channel quantum dot laser is the only laser that generates the CW lights for all the CATV channels output from a cable television system.

5. The system as claimed in claim 1, wherein a number of the CW lights is based on a channel plan of a CATV network corresponding to the CATV channels.

6. The system as claimed in claim 5, wherein a spectral distribution of the CW lights is based on the channel plan of the CATV network corresponding to the CATV channels.

* * * * *